(12) United States Patent
Mueller et al.

(10) Patent No.: US 8,189,466 B2
(45) Date of Patent: May 29, 2012

(54) MESSAGING INTERCHANGE SYSTEM

(75) Inventors: Frank Mueller, Aachen (DE); Steven Kearns, Fort Myers, FL (US); Kevin Doré Hunter, Fort Myers, FL (US)

(73) Assignee: NeoMedia Technologies, Inc, Boulder, CO (US)

( * ) Notice: Subject to any disclaimer, the term of this patent is extended or adjusted under 35 U.S.C. 154(b) by 548 days.

(21) Appl. No.: 12/403,127

(22) Filed: Mar. 12, 2009

(65) Prior Publication Data
US 2009/0305675 A1 Dec. 10, 2009

Related U.S. Application Data

(60) Provisional application No. 61/036,485, filed on Mar. 14, 2008.

(51) Int. Cl.
*H04J 1/16* (2006.01)
*H04J 3/14* (2006.01)
*H04L 12/58* (2006.01)
*H04M 1/725* (2006.01)

(52) U.S. Cl. ...................................... 370/230
(58) Field of Classification Search .................. 370/230, 370/236; 455/412.1, 412.2
See application file for complete search history.

(56) References Cited

U.S. PATENT DOCUMENTS

| | | |
|---|---|---|
| 3,961,164 A | 6/1976 | Reed et al. |
| 4,074,114 A | 2/1978 | Dobras |
| 4,365,148 A | 12/1982 | Whitney |
| 4,780,599 A | 10/1988 | Baus |
| 4,833,308 A | 5/1989 | Humble |
| 4,835,730 A | 5/1989 | Shimano et al. |
| 4,845,634 A | 7/1989 | Vitek et al. |
| 4,901,073 A | 2/1990 | Kibrick |
| 4,907,264 A | 3/1990 | Seiler et al. |
| 4,937,853 A | 6/1990 | Brule et al. |
| 4,959,530 A | 9/1990 | O'Connor |
| 5,038,023 A | 8/1991 | Saliga |
| 5,050,031 A | 9/1991 | Weiley |
| 5,111,391 A | 5/1992 | Fields et al. |

(Continued)

FOREIGN PATENT DOCUMENTS

EP 0465011 A2 1/1992

(Continued)

OTHER PUBLICATIONS

AirClic Press Release "AirClic unveils mobile information platform to unlock the power of smartcodes", Feb. 11, 2002.

(Continued)

*Primary Examiner* — Chi Pham
*Assistant Examiner* — Farah Faroul
(74) *Attorney, Agent, or Firm* — Barkume & Associates, P.C.

(57) ABSTRACT

Machine-readable codes are read, decoded and resolved by a messaging system in order to perform a desired function. If the code is not native to that (home) messaging system, then a resolution request is made to a central messaging interchange system to determine which other (destination) messaging system is native to and can resolve that code. The messaging interchange system then either returns the appropriate routing information back to the home messaging system (in which case the home messaging system sends the resolution request directly to the destination messaging system) or forwards the resolution request to the destination messaging system itself. The destination messaging system transmits a resolution response message to the home messaging system, either directly or via the messaging interchange system.

8 Claims, 6 Drawing Sheets

U.S. PATENT DOCUMENTS

| | | | |
|---|---|---|---|
| 5,115,326 | A | 5/1992 | Burgess et al. |
| 5,198,644 | A | 3/1993 | Pfeiffer et al. |
| 5,216,228 | A | 6/1993 | Hashimoto |
| 5,250,789 | A | 10/1993 | Johnsen |
| 5,268,565 | A | 12/1993 | Katoh et al. |
| 5,288,976 | A | 2/1994 | Citron et al. |
| 5,296,688 | A | 3/1994 | Hamilton et al. |
| 5,304,786 | A | 4/1994 | Pavlidis et al. |
| 5,307,490 | A | 4/1994 | Davidson et al. |
| 5,324,922 | A | 6/1994 | Roberts |
| 5,331,547 | A | 7/1994 | Laszlo |
| 5,340,966 | A | 8/1994 | Morimoto |
| 5,362,948 | A | 11/1994 | Morimoto |
| 5,382,779 | A | 1/1995 | Gupta |
| 5,386,298 | A | 1/1995 | Bronnenberg et al. |
| 5,393,965 | A | 2/1995 | Bravman et al. |
| 5,398,336 | A | 3/1995 | Tantry et al. |
| 5,405,232 | A | 4/1995 | Lloyd et al. |
| 5,414,626 | A | 5/1995 | Boorse et al. |
| 5,414,841 | A | 5/1995 | Bingham et al. |
| 5,418,713 | A | 5/1995 | Allen |
| 5,420,403 | A | 5/1995 | Allum et al. |
| 5,420,943 | A | 5/1995 | Mak |
| 5,424,524 | A | 6/1995 | Ruppert et al. |
| 5,519,878 | A | 5/1996 | Dolin, Jr. |
| 5,524,240 | A | 6/1996 | Barbara et al. |
| 5,530,852 | A | 6/1996 | Meske, Jr. |
| 5,550,976 | A | 8/1996 | Henderson et al. |
| 5,602,377 | A | 2/1997 | Beller et al. |
| 5,640,193 | A | 6/1997 | Wellner |
| 5,649,186 | A | 7/1997 | Ferguson |
| 5,657,233 | A | 8/1997 | Cherrington et al. |
| 5,659,740 | A | 8/1997 | Ezaki et al. |
| 5,671,282 | A | 9/1997 | Wolff et al. |
| 5,682,540 | A | 10/1997 | Klotz, Jr. et al. |
| 5,710,887 | A | 1/1998 | Chelliah et al. |
| 5,745,681 | A | 4/1998 | Levine et al. |
| 5,757,917 | A | 5/1998 | Rose et al. |
| 5,764,906 | A | 6/1998 | Edelstein |
| 5,765,176 | A | 6/1998 | Bloomberg |
| 5,778,367 | A | 7/1998 | Wesinger, Jr. et al. |
| 5,791,991 | A | 8/1998 | Small |
| 5,804,803 | A | 9/1998 | Cragun |
| 5,812,776 | A | 9/1998 | Gifford |
| 5,841,978 | A | 11/1998 | Rhoads |
| 5,848,413 | A | 12/1998 | Wolff |
| 5,905,248 | A | 5/1999 | Russell et al. |
| 5,905,251 | A | 5/1999 | Knowles |
| 5,913,210 | A | 6/1999 | Call |
| 5,918,214 | A | 6/1999 | Perkowski |
| 5,932,863 | A | 8/1999 | Rathus et al. |
| 5,933,829 | A | 8/1999 | Durst et al. |
| 5,938,726 | A | 8/1999 | Reber et al. |
| 5,938,727 | A | 8/1999 | Ikeda |
| 5,940,595 | A | 8/1999 | Reber et al. |
| 5,950,173 | A | 9/1999 | Perkowski |
| 5,971,277 | A | 10/1999 | Cragun et al. |
| 5,978,773 | A | 11/1999 | Hudetz et al. |
| 5,979,757 | A | 11/1999 | Tracy et al. |
| 5,986,651 | A | 11/1999 | Reber et al. |
| 5,992,752 | A | 11/1999 | Wilz, Sr. et al. |
| 5,995,105 | A | 11/1999 | Reber et al. |
| 6,012,102 | A | 1/2000 | Shachar |
| 6,027,024 | A | 2/2000 | Knowles |
| 6,064,979 | A | 5/2000 | Perkowski |
| 6,076,733 | A | 6/2000 | Wilz, Sr. et al. |
| 6,101,483 | A | 8/2000 | Petrovich et al. |
| 6,101,486 | A | 8/2000 | Roberts et al. |
| 6,101,534 | A | 8/2000 | Rothschild |
| 6,108,656 | A | 8/2000 | Durst et al. |
| 6,123,259 | A | 9/2000 | Ogasawara |
| 6,134,548 | A | 10/2000 | Gottsman et al. |
| 6,157,935 | A | 12/2000 | Tran et al. |
| 6,199,048 | B1 | 3/2001 | Hudetz et al. |
| 6,199,099 | B1 | 3/2001 | Gershman et al. |
| 6,202,060 | B1 | 3/2001 | Tran |
| 6,317,718 | B1 | 11/2001 | Fano |
| 6,327,570 | B1 | 12/2001 | Stevens |
| 6,338,085 | B1 | 1/2002 | Ramaswamy |
| 6,401,085 | B1 | 6/2002 | Gershman et al. |
| 6,430,554 | B1 | 8/2002 | Rothschild |
| 6,448,979 | B1 | 9/2002 | Schena et al. |
| 6,542,933 | B1 | 4/2003 | Durst et al. |
| 6,546,418 | B2 | 4/2003 | Schena et al. |
| 6,625,581 | B1 | 9/2003 | Perkowski |
| 6,651,053 | B1 | 11/2003 | Rothschild |
| 6,655,597 | B1 | 12/2003 | Swartz et al. |
| 6,675,165 | B1 | 1/2004 | Rothschild |
| 6,766,363 | B1 | 7/2004 | Rothschild |
| 6,865,608 | B2 | 3/2005 | Hunter |
| 6,993,573 | B2 | 1/2006 | Hunter |
| 6,993,593 | B2 * | 1/2006 | Iwata ............................ 709/238 |
| 7,016,532 | B2 | 3/2006 | Boncyk et al. |
| 2002/0084330 | A1 | 7/2002 | Chiu |
| 2002/0085025 | A1 | 7/2002 | Busis et al. |
| 2002/0185537 | A1 | 12/2002 | Konda |
| 2003/0155413 | A1 | 8/2003 | Kovesdi et al. |
| 2004/0003052 | A1 | 1/2004 | Yoda |
| 2004/0024867 | A1 | 2/2004 | Kjellberg |
| 2005/0245241 | A1 * | 11/2005 | Durand et al. ............. 455/414.1 |
| 2006/0111967 | A1 * | 5/2006 | Forbes ............................ 705/14 |
| 2007/0123219 | A1 * | 5/2007 | Lovell ....................... 455/412.1 |
| 2008/0082353 | A1 | 4/2008 | Hudetz |

FOREIGN PATENT DOCUMENTS

| | | |
|---|---|---|
| EP | 0744856 A2 | 11/1996 |
| EP | 0837406 A2 | 4/1998 |
| EP | 1204066 B1 | 2/2005 |
| JP | 10171758 | 6/1998 |
| JP | 2002077994 | 3/2002 |
| JP | 2002358255 | 12/2002 |
| JP | 2003036213 | 2/2003 |
| WO | WO98/03923 | 1/1998 |
| WO | WO98/06055 | 2/1998 |
| WO | WO98/19259 | 5/1998 |
| WO | WO98/24036 | 6/1998 |
| WO | WO98/24050 | 6/1998 |
| WO | WO98/40823 | 9/1998 |
| WO | WO98/49813 | 11/1998 |
| WO | WO02/39309 | 5/2002 |

OTHER PUBLICATIONS

AirClic web page: Wireless Camera Phones/PDA as Scanners, http://web.archive.org/web/20030401122715/www.airclic.com/devices/devices_camera_scanners.html.

Anonymous, Internet-On-A-Disk #7, Dec. 3, 1994.

Anonymous, NL-KR Digest, Oct. 3, 1998.

B. Ibrahim, World-wide algorithm animation, North Holland Publishing, Nov. 1994.

Bodenhammer, Lori, "Bar codes make online grocery shopping easier", www.techTV.com, 1 page, Nov. 1999.

Chen Ding et al., "Reverse mapping of referral links from storage hierarchy for Web documents", IEEE International Conference on Tools with Artificial Intelligence, pp. 216-219, Nov. 2000.

Daniel, Jr., et al., URC Scenarios and Requirements, IETF, Nov. 21, 1994.

Dharap et al., A Facility for Tracing Wide-Area Information Access, Penn State University, Nov. 1, 1994.

Dynetic Press Release: "AirClic and dynentic solutions team to offer wireless tracking services", Oct. 16, 2001.

Hicks, et al., Application of Automated Data Scanning Techniques to US Army Directorates of Engineering and Housing Operations, USACE, Sep. 1991.

Luotonen, Ari, "World-Wide Web Proxies"; Apr. 1994.

McDonough, Brian, "Cingular, BarPoint nudge wireless users toward M-Commerce", www.wirelessnewsfactor.com/perl/story/12462.html, pp. 1-2, Aug. 2001.

Nokia Introduces Innovative Mobile Enhancements, http://press.nokia.com/PR/200303/894912_5.html, Mar. 11, 2003.

P. Mockapetris, Domain Names—Concepts and Facilities, Request for Comments 1034, Nov. 1987.

P. Mockapetris, Domain Names—Concepts and Facilities, Request for Comments 882, Nov. 1983.

P. Mockapetris, Domain Names—Concepts and Facilities, Request for Comments 883, Nov. 1983.

P. Mockapetris, Domain Names—Implementation and Specification, Request for Comments 1035, Nov. 1987.

Schwartz et al., A Comparison of Internet Resource Discovery Approaches, Computing Systems, vol. 5 No. 4, Fall 1992.

T. Berners-Lee et al., Uniform Resource Locators (URL), Request for Comments 1738, Dec. 1994.

T. Berners-Lee, The Original HTTP as defined in 1991.

Vass, Jozsef et al., "Interactive Image Retreival over the Internet", Proceedings of the 17th IEEE Symposium on Reliable Distributed Systems, Oct. 20-23, 1998, pp. 461-466.

Visich, JR., Bar Codes and Their Applications, SUNY Stony Brook, 1990.

* cited by examiner

MESSAGING INTERCHANGE SYSTEM

CROSS-REFERENCE TO RELATED APPLICATION

This application is based on and claims filing priority of co-pending U.S. provisional patent application Ser. No. 61/036,485 filed on Mar. 14, 2008.

TECHNICAL FIELD

This invention relates to messaging systems that enable a user to read a machine-readable code and retrieve a networked resource associated with that code (such as an optical messaging system that scans a barcode), and in particular to a messaging interchange system that enables interoperability of disparate messaging systems.

BACKGROUND ART

Various companies are in the process of developing and deploying systems designed to allow end users to perform operations via client devices (also called access points) such as mobile phones, triggered by reading machine-readable codes such as linear (1D) and two-dimensional (2D) barcodes. For the purposes of this specification, such systems are referred to generally as messaging systems (and in the case of barcode scanning as Optical Messaging Systems (OMS)). Some examples of the operations that might be triggered by a machine-readable code include, but are not limited to:

Launching a web browser to a particular URL
Dialing a telephone number
Sending an SMS
Displaying a coupon Certain classes of barcodes and their corresponding operations can be properly performed by any access point that is capable of reading the particular barcode. An example of this might be a full URL that is encoded into a 2D barcode such as a DATAMATRIX code. Any access point that is capable of reading this barcode and extracting the URL would then be capable of launching a web browser to that address. For the purposes of this specification, we refer to these as direct or unmanaged codes.

Other classes of barcodes cannot be processed without the involvement of processes or services not resident on the access point. Where the internal encoding of the barcode data is proprietary, and/or where the data requires interaction with a server-based database in order to complete the operation, an interchange with the issuing OMS is required in order to properly complete the operation intended. For the purposes of this specification, we refer to these as indirect or managed codes.

As OMS systems become more ubiquitous and widely deployed, it is likely that situations will arise in which an access point developed by Company A will be employed by users to read Managed Codes issued by Company B. Because of the requirement for the involvement of Company B's infrastructure, without some interface between this infrastructure and Company A's access point(s), such codes will not be able to be processed.

It is therefore an object of the present invention to provide a methodology and system for providing interoperability between and amongst various disparate messaging systems.

DISCLOSURE OF THE INVENTION

The present invention is a message interchange system that provides a method via which individual messaging systems can collaborate and interoperate in order to allow each system to extend support to codes of the other systems. Specifically, the system of the present invention is designed to allow a messaging system which receives a foreign code (i.e. not a code native to that OMS) to submit that code to the messaging interchange system for identification and correct routing information or to redirect the code to the correct messaging system (e.g.) resolution server. The messaging interchange system takes the responsibility for determining the correct owner of the code, providing routing information back to the home (originating) messaging system or routing the request to the destination messaging system (the owning messaging system), and returning an indication of the function that is to be performed back to the home messaging system via a standardized protocol. The home messaging system can then translate this information into its own internal formats, and arrange for the intended operation to be performed for the user.

The net effect of this is that, assuming Company A and Company B support each other's barcode symbologies, codes produced by Company B's messaging system can be transparently read and serviced by Company A's access points (and vice versa), thus extending the reach and interoperability of both companies, vastly improving the end user experience, thereby facilitating market adoption of messaging systems and services as a whole.

In support of this goal, the present invention provides the following:

An architecture for the messaging interchange system
A protocol (MIP) used to exchange information between the messaging interchange system and the individual messaging systems (i.e. the home and destination systems).
A high-level set of procedures that compliant messaging systems will follow in interacting with the messaging interchange system.
A numbering system that may be used for proprietary Managed Codes to ensure ubiquitous and unambiguous routing Thus, provided is a method of and system for processing a machine readable code to perform a desired function, by reading with a client device a machine-readable code to obtain code data, then transmitting the code data from the client device to a home messaging system, and processing the code data at the home messaging system to determine if the code data is native to the home messaging system. If the code data is native to the home messaging system, then the home messaging system further processes the code data by performing a function in accordance with the code data. If the code data is not native to the home messaging system, then the home messaging system transmits a resolution request message to a messaging interchange system, the resolution request message including the code data, and the messaging interchange system processes the resolution request message to determine routing information to a destination messaging system, wherein the code data is native to the destination messaging system. The messaging interchange system then enables transmission of the resolution request message to the destination messaging system. The destination messaging system receives the resolution request message, analyzes the code data from the resolution request message, and provides a resolution response message for the home messaging system. The home messaging system receives the resolution response message and performs a function in accordance therewith.

The messaging interchange system enables transmission of the resolution request message to the destination messaging system by determining path information from the resolution request message, the path information indicating whether (A) the routing information should be returned to the home messaging system, or (B) the routing information should be used by the messaging interchange system for forwarding the resolution request message to the destination messaging system.

If the path information indicates that (A) the routing information should be returned to the home messaging system, then the messaging interchange system transmits a response message to the home messaging system, the response message including the routing information for the destination messaging system. The home messaging system uses the routing information for the destination messaging system to send the resolution request message to the destination messaging system. The destination messaging system provides a resolution response message for the home messaging system by transmitting the resolution response message directly to the home messaging system or client device.

If, however, the path information indicates that (B) the routing information should be used by the messaging interchange system for forwarding the resolution request message to the destination messaging system, then the messaging interchange system uses the routing information for the destination messaging system to forward the resolution request message to the destination messaging system. The destination messaging system provides a resolution response message for the home messaging system by transmitting the resolution response message to the messaging interchange system, and the messaging interchange system forwards the resolution response message to the home messaging system.

In another aspect of the invention, provided is a messaging interchange system to manage a plurality of independent messaging systems. The messaging interchange system receives a resolution request message from a home messaging system, the resolution request message including code data obtained from a machine-readable code. The messaging interchange system then processes the resolution request message to determine (i) routing information to a destination messaging system, wherein the code data is native to the destination messaging system, and (ii) path information indicating whether (A) the routing information should be returned to the home messaging system, or (B) the routing information should be used by the messaging interchange system for forwarding the resolution request message to the destination messaging system. If the path information indicates that (A) the routing information should be returned to the home messaging system, then the messaging interchange system transmits a response message to the home messaging system, the response message including the routing information for the destination messaging system. If, however, the path information indicates that (B) the routing information should be used by the messaging interchange system for forwarding the resolution request message to the destination messaging system, then the messaging interchange system uses the routing information for the destination messaging system to forward the resolution request message to the destination messaging system, the messaging interchange system receives a resolution response message from the destination messaging system, and the messaging interchange system forwards the resolution response message to the home messaging system or client device.

BEST MODE FOR CARRYING OUT THE INVENTION

Although the present invention applies to any machine-readable code technology, such as but not limited to linear and two-dimensional bar codes, matrix codes, RFID codes, and magnetic stripe codes, the preferred embodiment uses optical imaging of barcodes and the like. Thus, the machine readable code will be referred to herein as a barcode, the messaging systems will be referred to herein as optical messaging systems (OMS), and the messaging interchange system will be referred to herein as an optical messaging interchange (OMI).

As such, the following terms are also defined for purposes of this specification:

| | |
|---|---|
| Access Point | A client device at which a user may initiate a transaction using a machine-readable code such as an optical code. Examples include mobile phones equipped with barcode reading software, wireless coupon readers, etc. |
| Direct Code/ Unmanaged Code | A barcode that contains all the required information necessary to perform the function for which it was intended. |
| Indirect Code/ Managed Code | A barcode whose processing requires the involvement of processes or services not resident in the Access Point. |
| Optical Messaging Interchange (OMI) | A system designed to allow individual OMS to interchange data in order to be able to service each other's barcodes. |
| Optical Messaging Interchange Protocol (OMIP) | The protocol via which OMS systems communicate with the OMI. |
| Optical Messaging System (OMS) | A system designed to perform operations for an end user in response to the reading of codes such as 1D or 2D barcodes. |

For the purposes of this specification, it will be assumed that an OMS is composed of two separate classes of devices or components:

Access Points are the client devices at which an end user initiates a transaction. Typical Access Points might include a cellular phone with barcode reading capability or a networked coupon reader. The only basic requirements are that the client device be capable of reading a machine-readable code such as a barcode, sending it to an external service for processing when and if required, and either executing some operation in response, or displaying the result of the transaction.

Resolution Services represent the additional processes or systems not resident in the Access Points that are required in order to fully process Managed Codes. Typically, these will be network-connected computers containing databases, etc.

While an architecture in which Access Points and Resolution Services are physically separate is likely to be the most common scenario, this invention makes no attempt to constrain the internal implementation of any Optical Messaging System.

Figure 1:
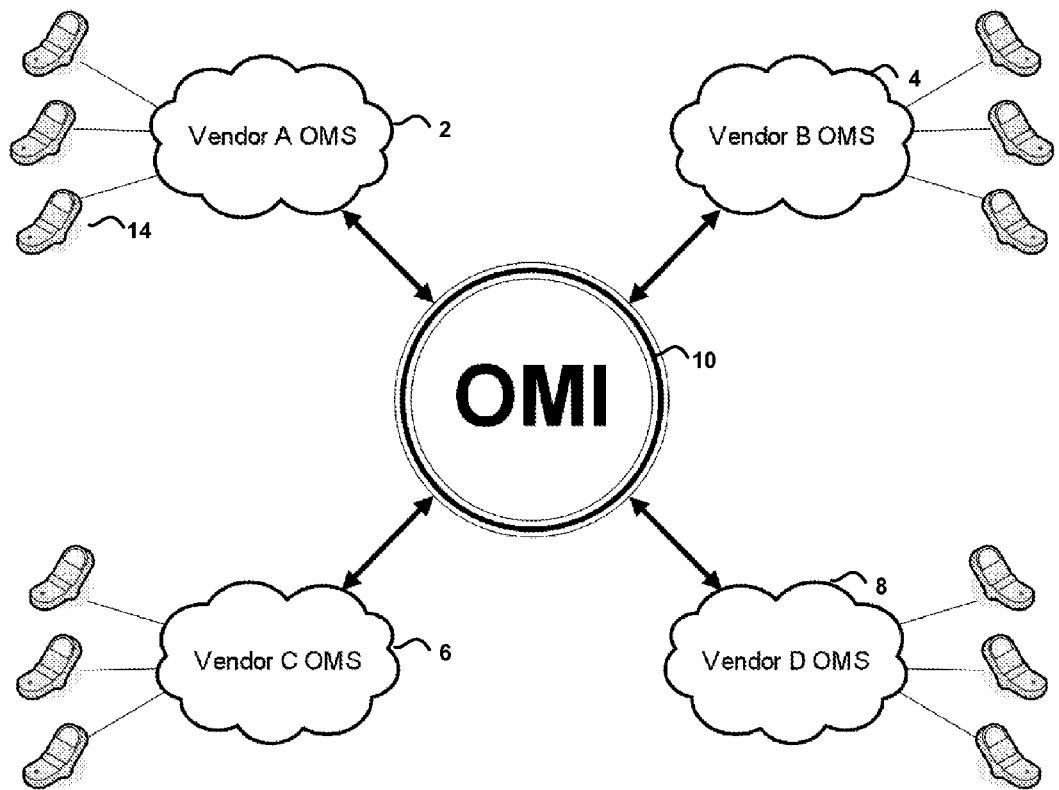
FIG. 1 is an illustration of the topology of the present invention.

As shown in FIG. 1, the OMI system uses a "star" topology, in which each individual OMS 2, 4, 6, 8 need communicate only with the OMI system 10. Alternate arrangements are, of course, possible—in particular, one could adopt a topology in which each individual OMS communicated directly with every other OMS. Such an arrangement, however, is difficult to extend over time as more OMSs come on line. With the topology of FIG. 1, when a new OMS joins the system, each of the other OMSs immediately gain the benefit of the new OMS without requiring any changes on their part.

Figure 2:
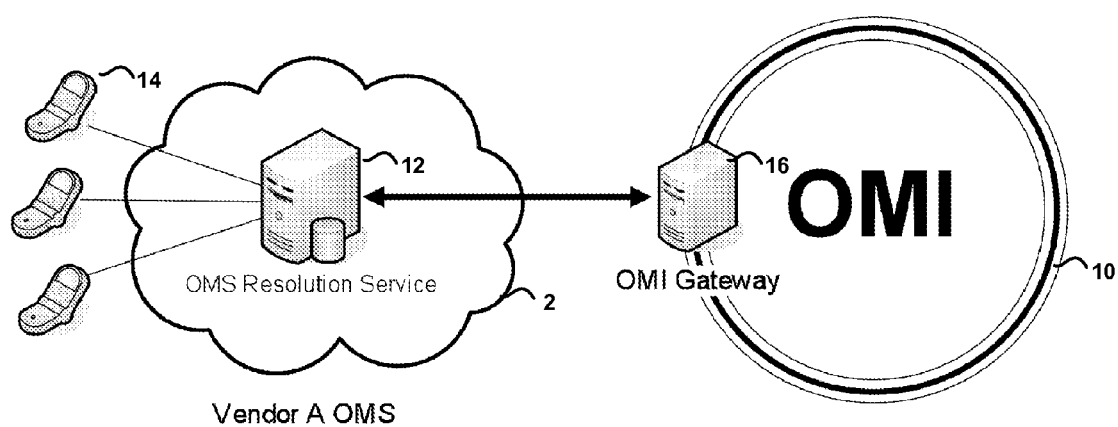
FIG. 2 is an illustration of the interface of the present invention.

As mentioned earlier, each individual OMS may have its own internal architecture and systems. The member OMSs, however, communicate with the OMI 10 via systems known as OMI Gateways 16 as shown in FIG. 2.

Foreign codes are submitted to the OMI 10 via the OMI Gateway 16, which then handles the internal details required to provide the address of the destination (owning) OMS to the home (originating) OMS or directly route the request to the destination OMS and return the result to the home OMS. Similarly, an OMS may receive requests for resolution of its own codes via an OMI Gateway or directly from a foreign OMS, and will be responsible for providing the appropriate resolution information back to the home OMS.

The link between each individual OMS and the OMI is via the Optical Messaging Interchange Protocol (OMIP).

Figure 3:
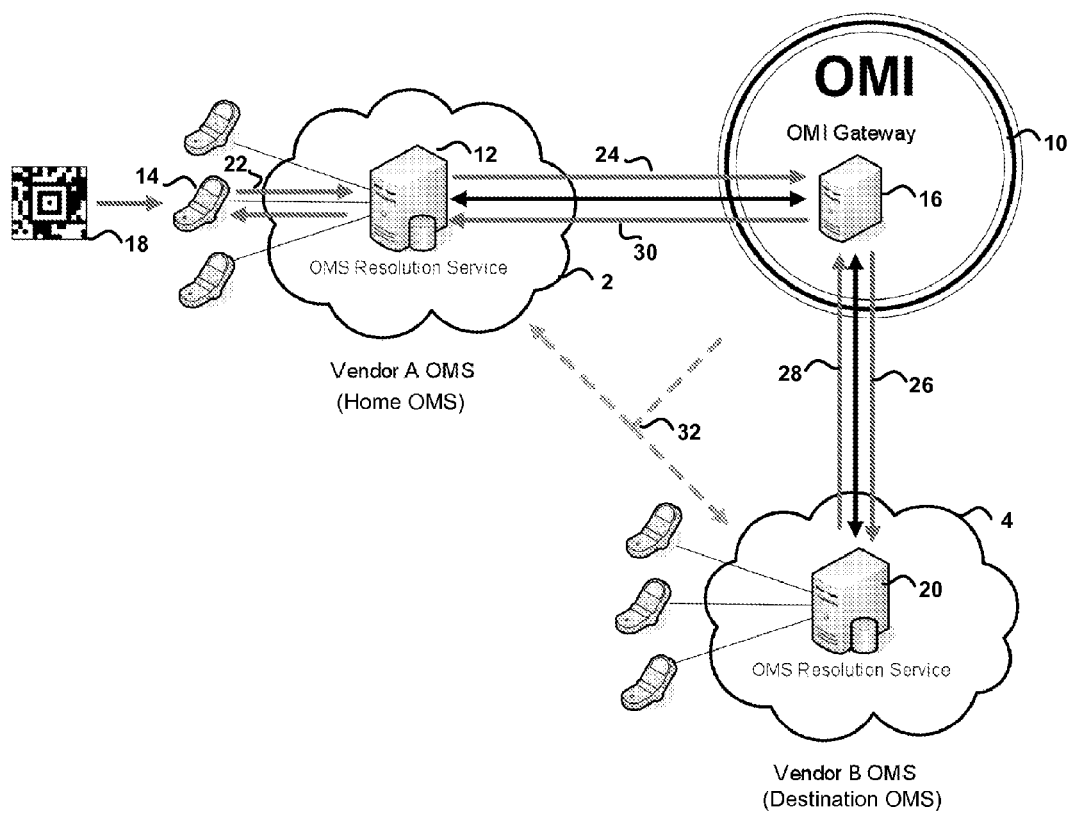
FIG. 3 is an illustration of the sequence of operations.
Figure 5:
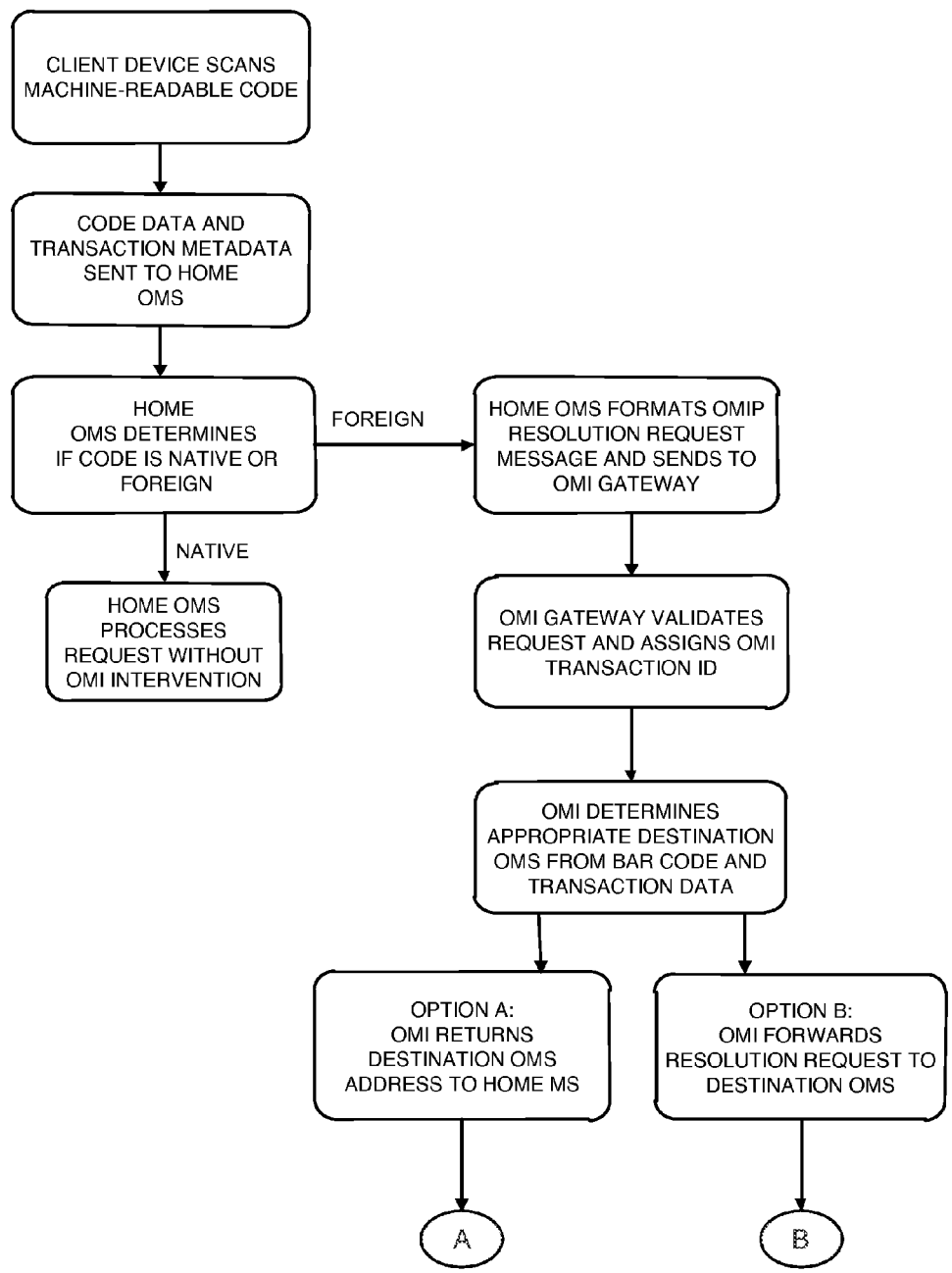
FIGS. 5 and 6 are a flowchart of the operation of the present invention.
Figure 6:
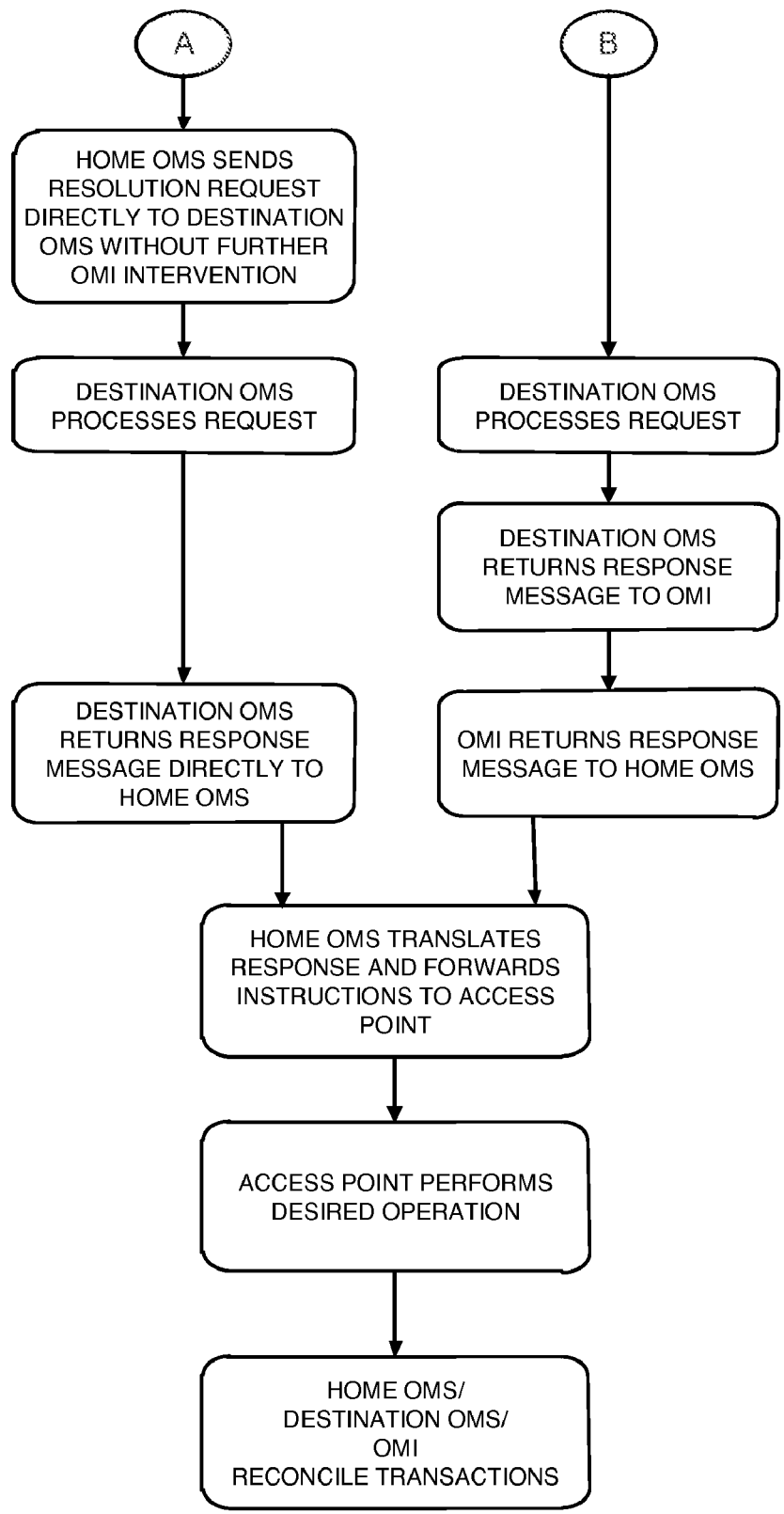

The standard sequence of operations for an OMI interchange is illustrated in FIG. 3, and with reference to the flowchart in FIGS. 5 and 6, and is described below.

1. An Access Point 14 that is part of OMS A reads a barcode 18. For the purpose of this specification, OMS A will be referred to as the home or originating OMS, since it is the home system with which the user transaction originates.
2. The Resolution Service 12 in OMS A receives the barcode data from the Access Point 14, along with metadata regarding the transaction, using procedures and protocols that are internal to Vendor A, along path 22.
3. The Resolution Service 12 in OMS A processes the code data from the Access Point 14 and attempts to resolve it to determine what action to take. For example, the Resolution Service 12 may attempt to look up a URL from a local database as a function of the code data, and then return that URL to the Access Point 14 so the Access Point may load the URL into a browser. These resolution techniques are described in the Applicant's U.S. Pat. No. 5,978,773 SYSTEM AND METHOD FOR USING AN ORDINARY ARTICLE OF COMMERCE TO ACCESS A REMOTE COMPUTER, the specification of which is incorporated by reference herein; and also in Applicant's U.S. Pat. No. 6,993,573 AUTOMATIC ACCESS OF INTERNET CONTENT WITH A CAMERA-ENABLED CELL PHONE, the specification of which is incorporated by reference herein. Assuming that the Resolution Service is able to recognize the code and resolve it, then that code is considered to be native to that particular OMS.
4. If the Resolution Service 12 in OMS A is unable to recognize and resolve the code, then the code is considered to be a foreign code (i.e. not a native code), and thus this request is not one that the OMS A can service by itself. Rather than just crashing and/or returning an error message as in the prior art, it formats an OMIP Resolution Request message and sends it to the OMI Gateway, per the Optical Messaging Interchange Protocol (OMIP), along path 24.
5. The OMI Gateway 16 validates that the request is properly formatted, and comes from an authorized source.
6. The OMI 10 assigns the Resolution Request a unique OMI Transaction ID, and adds it to the Resolution Request.
7. Using the barcode data and transaction metadata, the OMI 10 determines the OMS that needs to service this request. For the purposes of this specification, the OMS that will service the request will be referred to as the Destination OMS.
8. The OMI Gateway 16 enables transmission of the resolution request message to the appropriate destination OMS by either returning the address of the Destination OMS to the home OMS or forwarding the Resolution Request directly to the Destination OMS along path 26. To determine which of these actions to take, the OMI 10 determines the appropriate path information from the resolution request from the home OMS, which serves to inform the OMI 10 how to handle the transaction.
9. The Destination OMS's Resolution Service 20 performs the required processing to determine the nature of the operation the end use should see in response to the action of scanning the code 18.
10. The Destination OMS 4 responds directly to the home OMS 2 (if the resolution request came from the home OMS) or via the OMI Gateway 16 along path 28 and path 30 (if the resolution request came from the OMI 10) with a Resolution Response message. This message includes the instruction back to the originating Access Point 14 as to what operation to perform.
11. The Resolution Service 12 in the home OMS 2 translates the information in the Resolution Response message into its own internal format, if required, and transmits the result back to the Access Point 14.
12. The Access Point 14 performs the desired operation for the user.
13. Later, the OMI 10 provides the home OMS 2 and the destination OMS 4 with reports and financial reconciliation information (dashed arrows 32).

Note that the process described above is synchronous and session oriented—the home OMS issues a Resolution Request and receives back the corresponding Resolution Response as part of the same session, and in sequence. If required to meet its processing load, a single home OMS may make multiple simultaneous Resolution Requests to the OMI. Similarly, the OMI can make multiple simultaneous requests to an individual OMS for resolution. The session-oriented nature of the protocol means that no extra steps need to be taken to match up requests and responses.

Obviously, there are a number of exception cases:
1. The OMI might not be able to determine an OMS to service the Resolution Request. This might happen if an end user scanned a barcode that was malformed, or which was not produced by any of the member OMS.
2. The Destination OMS may be offline, unable to be contacted, or the Resolution Request to the Destination OMS may time out.
3. The Destination OMS may indicate that the specified barcode data is no longer valid, or, in fact, was not originally produced by it.
4. There may be business reasons for the Destination OMS to reject the request to process the request.

In each of the above cases, the OMI will return an appropriate indication back to the home OMS.

In addition, it is possible that a participating OMS may support operations (and associated barcodes) that are not available through another company's Access Point. For example, OMS A might support barcodes that can launch a URL, send an SMS or dial the phone, while Access Points from OMS B might only support launching a URL. In such a situation, if the Access Point from OMS B were to scan a send SMS barcode produced by OMS A, the system as a whole would be able to return the command to OMS B's server, but the action associated with the barcode would not be able to be performed by the end user's software.

In order to handle this situation, part of the metadata that is sent by the home OMS in the Resolution Request includes the set of operations that the home Access Point is able to perform. If the code resolves to an unsupported operation, the Destination OMS can then detect this, and either choose to return a different, compatible operation, (e.g. return a message to be displayed) or simply send an Unsupported Operation error indication back. In the latter case, the Home OMS will take the appropriate action to notify the user that the operation could not be completed.

The business model that underlies the OMI operates on the following assumptions:
1. It is the OMS that actually resolves the request (i.e. the Destination OMS) which has a revenue source associated with each transaction.
2. Destination OMS Vendors are willing to share a portion of their revenue with OMS Vendors who broaden their reach by fielding requests using their Access Points on behalf of the Destination OMS, and with the OMI, in return for acting as the interchange mechanism.

Based on this, transactions that result in a Destination OMS resolving or providing content for transactions initiated by an Home OMS will result in payment from the Destination OMS to both the Home OMS and the OMI. On the other hand, transactions for which the Home OMS provides the eventual content, even if the transaction is initially submitted through the OMI, will not result in payments.

It should be pointed out that, although the majority of this specification discusses the case in which the OMI connects OMS vendors who each support a resolution service of their own, an additional case exists. This is the situation in which a company is in the business of providing Access Points only, and does not have a Resolution Service of its own. Such a vendor can be served perfectly well by the OMI—in this case, the client systems can communicate directly with the OMI Gateway or for simplicity, they can communicate with a protocol translator system that will accept requests from the Access Points and translate them into the OMI Protocol.

The business model for a client-only vendor would presumably be to collect the revenue share offered by the Destination OMS vendors.

System Functionality

As described previously, an access point or client device is any device that is capable of reading or scanning a machine readable code such as a barcode symbol and sending code data to an associated messaging system. Examples include cell phones with cameras as imaging devices and the like, which may communicate with the associated messaging system via a cellular telephone network as known in the art. These devices will include input circuitry for reading the desired machine readable codes, such as a bar code scanner or optical imager (e.g. a camera), and will also include processing circuitry programmed to execute the required functions as described herein, all as well known in the art.

The messaging systems (for example as described in the above-mentioned U.S. Pat. No. 6,993,573 and/or U.S. Pat. No. 6,993,573) will be in networked communications with the OMI Gateway 16 in order to access the services of the OMI 10. For example, these systems may interoperate over a wide area network such as the Internet. In this case, it is simple for the different messaging systems 2, 4, 6, 8 to also communicate with each other via the Internet, for example in the case where the destination OMS routing information (address) is sent back from the OMI 10 to the home OMS 2 so the home OMS 2 can send the resolution request directly to the destination OMS 4 rather than via the OMI 10. The messaging systems will also have processing circuitry programmed to execute the functions described herein.

The messaging interchange or OMI 10 is a computer server system programmed for managing the resolution requests, determining the correct routing information (such as by database lookups), and carrying out the various OMI functions described herein.

The OMI supports the routing of both commercial and non-commercial codes. This section of the specification provides a brief description of the various code types, as well as an overview of how the routing is performed.

Codes are broken down into three major categories:
Commercial Codes—existing, industry-standard codes used in public commercial applications. These codes are specified and controlled by existing national and/or international organizations.
OMI Codes—a code structure, one of which is specified in this document, intended for unambiguous routing through the OMI. Essentially, OMI Codes are intended to be a domain-specific equivalent to Commercial Codes, in that they would be cross-OMS-vendor.
Proprietary Codes—individual OMS vendors have existing proprietary coding standards. To the extent possible, these codes will be supported by the OMI in order to minimize the degree to which OMS vendors will have to adapt their systems to support a unified global standard. The primary challenge with Proprietary Codes is that there are likely overlaps between the various systems, complicating the routing process.

It is important to remember that, when dealing with these various code types, that the term code can have two distinct meanings. The first meaning, and the one that frequently comes to mind, is the physically printed barcode. The second, and perhaps more important, is the numbering plan that is used.

In the case of UPC codes, for example, the Uniform Code Council set up a numbering scheme that called for a 12-digit code, where certain of the digits identified the manufacturer and other digits identified the specific product. In addition, a symbology was defined, which described the way that the digits in a UPC number would be physically encoded into a machine-readable barcode. The term UPC is frequently used to refer to both items, causing some confusion.

Wherever possible, the OMI is designed so that it can operate purely on the numbering plan, without requiring knowledge of the actual underlying symbology. This is done because the symbology information may not always strictly be present—some systems could offer the ability for numeric codes to be typed in by the user, as opposed to being scanned. In this case, if the collection of numbering plans supported by the OMI is not unambiguous, routing could be difficult or impossible.

Commercial Codes

The preferred embodiment OMI supports the routing of the following commercial product codes (although it can of course be extended to others): UPC-A, UPC-E, EAN-13, EAN-8, and ISBN. Each of these code types is briefly described below.

UPC-A Codes

Universal Product Codes (UPCs) have been used in the United States since the 1970's to identify commercial products for checkout and inventory control. The A variety uses a numbering plan that is 12 digits in length, structured as follows:

A single Number System digit that indicates the category of code.
A five-digit Manufacturer Code.
A five-digit Product Code.
A single Check Digit.

The Number System digit was intended to reserve series of codes for such items as private in-store-only codes, coupons, etc. Manufacturer codes are specific to a particular Number System, so, as a result, in traditional UPC codes the first six digits of the code effectively identify the manufacturer or owner of the code. The manufacturer is the responsible for assigning product codes as desired within the supported range.

In recent years, just as the Internet Protocol Address space began to be exhausted, the governing body for UPC realized that the Manufacturer Code space was also in jeopardy of being exhausted. As a result, variable length company prefixes were introduced in January 2005. Thus, at present, company prefixes can vary from 6 to 9 digits in length, leaving 5 to 2 digits for product codes.

UPC-E Codes

UPC-E is an 8-digit numbering standard used in situations where package size precludes the use of the full UPC-A barcode format. UPC-E is also referred to as zero compressed UPC, since the process of transforming a UPC-A into a UPC-E involves removing zeros. As such, every UPC-E can be transformed into an equivalent UPC-A. The reverse is not true—not every UPC-A has a UPC-E equivalent.

EAN-13 Codes

The early success of UPC codes led to the establishment of a somewhat broader standard, known as European Article Numbers (EAN). It is noted that Japanese Article Numbers (JAN) codes are a subset of EAN codes based on a Japanese country code, so for the purposes of this specification, JAN codes are identical to EAN codes. This is a 13-digit numbering standard, consisting of the following:

A 2-3 digit System Code which usually identifies the country of origin. Some exceptions include System Codes 978 and 979, which are reserved for encoding ISBN codes, and 977, which is used to encode ISSN's.
A 4-5 digit Manufacturer Code.
A 5-digit Product Code
A single check digit The encoding of the EAN system was carefully designed so that UPC codes were effectively grandfathered into the system—if one prefixes a UPC code with a single zero, the result is a valid EAN code. In addition, the underlying symbologies are compatible, so that if an EAN created by zero-prefixing a UPC code is encoded into the EAN symbology, the resulting physical pattern is the same as if the original UPC standard had been followed.

EAN-8 Codes

EAN-8 is a European standard barcode, intended for the same purpose as UPC-E. Unlike the UPC-E system, however, EAN-8 codes are not created by manipulating EAN-13 codes. Instead, EAN-8 is its own numbering standard including the following:

2-3 digit country code
4-5 data digits
1 check digit

Thus, unlike EAN-13, UPC-A and UPC-E codes, it is not possible to extract a manufacturer number from an EAN-8 code.

ISBN Codes

International Standard Book Numbers (ISBN) are 10-character codes. They consist of the following components:

Group Identifier Code
Publisher Code
Item Number
A single check digit

The lengths of the first three components vary by country and region. When printed, the components are typically separated by dashes, although the numbers are put together in ranges that make it possible to dissect the code without relying on the presence of the dashes.

Note that ISBN codes employ a check digit algorithm that operates in base 11. As a result, the check digit can have the values zero through ten, where ten is represented as the character X.

ISBN's are almost never printed in barcode form. Instead, the standard approach is to use what is sometimes called a Bookland code, which is a form of EAN code. An ISBN is typically transformed into a Bookland code by stripping off the ISBN check character, prefixing the code with the digits 978 to yield a 12-digit sequence, and then computing and appending the appropriate EAN check digit. Decoding such as barcode follows the reverse process—the 978 (or, in some cases 979) prefix is recognized as indicating that the barcode contains an ISBN, and the Group Identifier Code, Publisher Code and Item Number are extracted accordingly. If necessary, the full original ISBN can be recovered by regenerating the check character using this extracted information.

Ambiguities

UPC, EAN-13 and ISBN codes are completely disjoint from one another—they have lengths of 12, 13 and 10 respectively, so it is always possible to distinguish among them. Further, valid codes can be typically distinguished from random digit strings of matching length through the use of the check digit algorithm supported by each numbering plan.

UPC-E and EAN-8 codes, however, both are 8 digits in length, and their number plans intersect. The two codes use different bar-space patterns, meaning that it is possible for a barcode scanner reading the printed barcode to unambiguously determine the numbering plan to which a particular barcode belongs. Absent this information, however it is not always possible to unambiguously determine to which space a particular 8-digit sequence belongs—there are digit sequences that satisfy both symbology's formatting rules. A valid UPC-E has a 1 in 10 chance of passing the EAN-8 check digit test, and vice versa.

OMI Codes

While the OMI of the present invention supports the routing of commercial codes, it is recognized that there are many applications in which commercial codes are either not available or are not appropriate. OMS vendors have historically addressed this need by created their own proprietary numbering standards—indeed, applications using proprietary numbering systems have, so far, been developed and deployed to a greater degree than ones that use commercial codes. Unfortunately, the fact that these individually-developed numbering plans were independently created creates an interoperability challenge, in that a particular code may match the numbering systems of more than one OMS vendor, in much the same way that a particular digit sequence may be valid both as an EAN-8 and also as a UPC-E.

As a result, the present invention includes a new numbering system available for use by OMI vendors. This proposed system is intended as a top-level OMS industry standard, similar to the way that UPC is the top-level standard for retail. It allows independent generation of numbers by OMS vendors without the fear of duplication, and also is designed to guarantee that conforming numbers will not conflict with existing commercial codes. As a result, the ownership of any code generated according to this standard can always be unambiguously determined (at least, to the OMS level), and thus routing can be accomplished in an unambiguous manner. Tracking which code belongs to which customer within a particular OMS would still be the responsibility of the OMS vendor itself.

OMS vendors are not required to adopt this new numbering standard; however the ability of the OMI to successfully route existing proprietary number systems will depend on additional metadata which may or may not always be available. As such, vendors are encouraged to comply with this numbering standard when generating codes that may reasonably be expected to be encountered by foreign readers.

OMI Codes have, at minimum, an OMS identification prefix and an item identification number. One example of an OMI code could the following characteristics:

- They are all numeric, allowing the maximum number of barcode symbologies to be used to encode them. (Some symbologies cannot encode non-numeric characters. Others can, but do so poorly.)
- They are of variable length, allowing short codes to be created for situations in which space is valuable without restricting the total number of unique codes that can be created.
- They are always an odd number of digits in length. This avoids confusion with UPC-A, UPC-E, EAN-8 and ISBN commercial codes, and the QODE Number system currently in use by NEOMEDIA TECHNOLOGIES.
- They may not be 13 digits in length. This avoids conflict with EAN-13 codes.
- The first digit in the code is never a zero. Some OMS vendors may adopt proprietary barcode formats that have a fixed, as opposed to variable, capacity, and which store information as binary numbers instead of as character strings. In such a system, there might be no straightforward way for such a vendor to distinguish between, say, a code of 123 and a code of 00123.

Specifically, an OMI code has the following components:

TABLE 1

| Component | Length | Contents |
| --- | --- | --- |
| OMS ID Length | 1 | Indicates the length, in digits, of the OMS ID portion of the code |
| OMS ID | 1-9 | Indicates the particular OMS that issued this code. |
| Item ID | Variable | Assigned by the OMS vendor |
| Check digit | 1 | Check digit computed according to the algorithm documented below |

Each participating OMS will be issued a unique OMS ID number, which will be used in the creation of OMI Codes by that OMS Vendor. There is no fundamental reason a particular vendor could not have more than one OMS ID, however at present there is no compelling reason why more than one needs to be issued per vendor. The format of the Item ID field is left completely up to the particular OMS Vendor, allowing any proprietary sub-structure desired. As long as the OMS Vendor only generates codes with its own OMS ID, there is no fear of collisions between vendors. Thus, the OMS ID parallels in function the Manufacturer ID of the UPC numbering system.

The check digit is computed using the same algorithm used by the EAN-13 symbology. Thus, the check digit is correct if the following relationship holds:

(SUM(odd digits)+3*SUM(even digits)) mod 10=0

As an example, supposed that the vendor with OMS ID 16 wanted to encode an OMI Code with Item ID 123. In this case, the code would be 2161235, where:

The first 2 indicates that the next 2 digits are the OMS ID.
The 16 represents the OMS ID
The 123 represents the Item ID
The 5 is the check digit:

2+6+2+5+3*(1+1+3)=30

30 mod 10=0

The requirement that the code be of odd length (and not 13 digits in length) may require padding to be added at times. If, in the above case, the Item ID to be encoded had been 12 instead of 123, the naturally resulting code would have been six digits in length. In this case, the OMS Vendor has the option of padding either the Item ID field (i.e. encoding the Item ID as 012) or the OMS ID field (i.e. encoding the OMS ID as 016 instead of 16, and changing the OMS ID Length field accordingly). The choice is left to the OMS Vendor. Note that, in cases where the OMS Vendor has designed its own interpretation of the Item ID field to have internal structure, it may not be possible for the OMS Vendor to pad that field without destroying the meaning of the code. In this case, padding the OMS Vendor Length field is the only alternative.

OMS Vendors may obviously choose to use their own internal numbering standards within the Item ID field. Thus, an existing proprietary code could be transformed into an OMI Code by wrapping the proprietary code with the OMS Vendor Length, OMS Vendor and Check Digit fields, thus making the code unambiguously routable at the cost of a few extra digits. This parallels, to some extent, the way that international telephone numbers are made unambiguously routable by prefixing them with International Country Codes.

This system thus imposes a minimum overhead of three digits (or only two if one is comparing to a similar system that has a check digit). This system thus offers the following numbers of codes:

TABLE 2

| Total Code Length (digits) | OMS ID 1-9 (1 digit) | OMS ID 10-99 (2 digit) |
| --- | --- | --- |
| 5 | 100 | 10 |
| 7 | 1000 | 100 |
| 9 | 1,000,000 | 100,000 |
| 11 | 100,000,000 | 10,000,000 |
| 15 | 1,000,000,000,000 | 100,000,000,000 |

As stated earlier, Proprietary Codes represents that category of codes currently supported by existing OMS Vendors. One such example is the NEOMEDIA QODE Number system.

Because of the likelihood of conflicts between the various proprietary numbering systems, the OMI cannot reliably route Proprietary Codes without additional information. Fortunately, the majority of vendors that use such proprietary numbering systems also use some form of proprietary (or at least lesser-used) barcode symbology. Thus, in situations in which the code has been automatically read, and thus the symbology is known, these codes can be routed to their appropriate owner through the use of the symbology information.

Routing Process

This section of the specification describes how the OMI goes about routing code requests.

The OMI operates on the assumption that all codes fall into one of three categories:

- Exclusive Codes are those for which a particular OMS vendor has the exclusive right to provide content for the particular code. All Proprietary Codes fall into this category, as do all OMI Codes, since, in both cases, the particular code either originates with, or is assigned to, a particular OMS Vendor. In addition, Certain Commercial Codes may fall into this category if the owner of the Commercial Code decides to establish an exclusive relationship with a particular OMS Vendor for the handling of that group of codes (it is a fundamental assumption that Commercial Codes are the property of the company who arranged for their issue, and that they therefore have the right to determine how these codes are processed, should they so choose).
- Unrouteable Codes form the second category. This category includes Commercial Codes for which no OMS Vendor can offer content, as well as codes not supported by the OMI. The OMI is unable to assist in the provision of content for these codes. As such, individual OMS Vendors will be free to provide content for these codes as they see fit, or to provide error messages back to the user indicating that the code cannot be serviced.
- Non-Exclusive Codes form the final category. This category includes commercial codes which have not been exclusively assigned to a particular OMS Vendor, but for which one or more OMS Vendor can provide content (for example, multiple vendors may each have relationships with online booksellers, and thus may be able to serve ISBN codes that have not been exclusively assigned by the publisher to a particular destination).

Each OMS is required to submit any code that is not exclusively assigned to it to the OMI in order to determine whether that code is exclusively assigned to another OMS. If the code is not exclusively assigned to another OMS, the system provides the option for the home OMS to then provide its own content, or accept content from another OMS.

As such, the OMI procedures and protocols are designed to handle any of the following situations:

- OMS A reads a code that is exclusively serviced by itself (a native code).
- In this particular case, OMS A is not required to submit the code to the OMI. OMS A can simply service the code as if the OMI did not exist.
- OMS A reads a code exclusively serviced by OMS B (a foreign or non-native code).
- In this case, OMS A recognizes that the code is not exclusively assigned to itself. As a result, it submits the code to the OMI, which provides OMS A with the correct routing address of OMS B or simply routes the code to OMS B to be resolved. OMS B will compensate OMS A and the OMI for this transaction.
- OMS A reads a code that is not routable by the OMS (a foreign or non-native code).
- In this case, OMS A recognizes that the code is not exclusively assigned to itself. As a result, it submits the code to the OMI. The OMI recognizes that it cannot assist with the code, and returns an appropriate indication to OMS A. OMS A is then free to handle the request as it sees fit.
- OMS A reads a code that is not exclusively serviced by another OMS, but for which one or more other OMS's can provide content (a foreign or non-native code).
- In this case, OMS A recognizes that the code is not exclusively assigned to itself. As a result, it submits the code to the OMI. The OMI determines, using the procedure discussed below, to which OMS the request will be routed. The chosen OMS will compensate OMS A and the OMI for this transaction.
- OMS A reads a code that is not exclusively serviced by another OMS Vendor, for which one or more other OMS Vendors can provide content, but for which OMS A would prefer to provide its own content (a foreign or non-native code).
- In this case, OMS A recognizes that the code is not exclusively assigned to itself. As a result, it submits the code to the OMI, but with an indication that it would prefer to provide content if possible. The OMI determines that this code is not exclusively assigned to another OMS, and therefore returns an indication to OMS A that it is free to provide the content.

Thus, payments are only made in situations in which the final content is provided by an OMS other than the one that initiates the transaction. Thus, OMS A is not charged for any transaction in which OMS A ends up providing the content, even if the code was submitted to the OMI as part of the overall processing.

Routing Conventions

OMI routing is, fundamentally, performed based on the owner of the code to be serviced. Ownership is determined based on the combination of the barcode symbology, the code type and an OMS Routing ID, which may vary according to the code type. As stated earlier, for Proprietary codes, the barcode symbology is used to determine the owner of the code, and is generally sufficient for routing purposes.

Table 3 below indicates the quantities that constitute the OMS Routing ID for the other code types:

TABLE 3

| Code Type | Routing ID |
| --- | --- |
| UPC-A and UPC-E | Number Series Digit + Manufacturer Code |
| EAN-13 | System Code + Manufacturer Code |
| ISBN | Group Identifier Code + Publisher Code |
| OMI Codes | OMS ID |
| EAN-8 | The entire code |

Note that EAN-13 codes that carry ISBN codes inside them could be transformed into their ISBN format before the routing processes are carried out.

In the absence of symbology information, ambiguities between UPC-E and EAN-8 are resolved based on the country of origin of the request—if the request comes from North America, a code that matches both the UPC-E and EAN-8 standard will be interpreted as UPC-E. Otherwise, it will be interpreted as an EAN-8. While not impossible, it is assumed that it is highly unlikely for a product marked with an EAN-8 code to be present in North America. The converse (a product marked with a UPC-E being found in Europe) is somewhat more likely, however the ambiguity rules are only applied when the symbology is not known (usually as a result of manual entry) and when the code also matches both the UPC-E and EAN-8 formatting rules.

The OMI will support routing of transactions based on the following quantities:

Home OMS
Barcode Symbology

Routing ID from the barcode data

The rules that the OMI applies for routing transactions assume that, in the case of Non-Exclusive Codes, individual OMS participants will come to business agreements for the groups of codes that will be cross-routed, and the terms under which this will take place. The OMS vendors will then submit this information to the OMI so that the routing rules can be implemented automatically.

In particular, in addition to the rules required to support Exclusive Codes, the OMI will support routing rules that support the following:

- Allowing a particular Home OMS to direct all of its Resolution Requests for a specific barcode symbology to a particular Destination OMS. A scenario in which this might be appropriate would be if several OMS were capable of resolving UPC codes, and the Home OMS wanted its traffic directed to a particular destination.
- Allowing a particular Home OMS to direct requests for particular combinations of symbology and Routing ID to a particular Destination OMS. A scenario in which this might be appropriate would be if several OMS were capable of resolving subsets of the UPC code space, and the Home OMS wanted some of its traffic directed to one destination and some to another destination.
- In the absence of a more specific rule, allowing all Resolution Requests for a particular barcode symbology to be routed to a particular Destination OMS. This covers the case where a particular symbology is used by only one OMS, allowing the routing of that OMS's proprietary codes.

Finally, the transaction routing will support an option whereby a particular Home OMS can prevent transactions from going to a particular Destination OMS via the OMI routing process. This might be appropriate in situations in which only one OMS provides content for a particular category of codes, but the two OMS could not come to mutual agreement on financial terms, or where there were other agreements whereby they would not service one another's codes. This would allow these OMS to participate in the overall OMI structure for other code types but essentially not see one another for this particular code type without needing to explicitly pre-filter the codes that they sent up to the OMI. Rules of this nature would need to have valid business reasons, and be approved by the OMI.

OMI System Architecture

Figure 4:
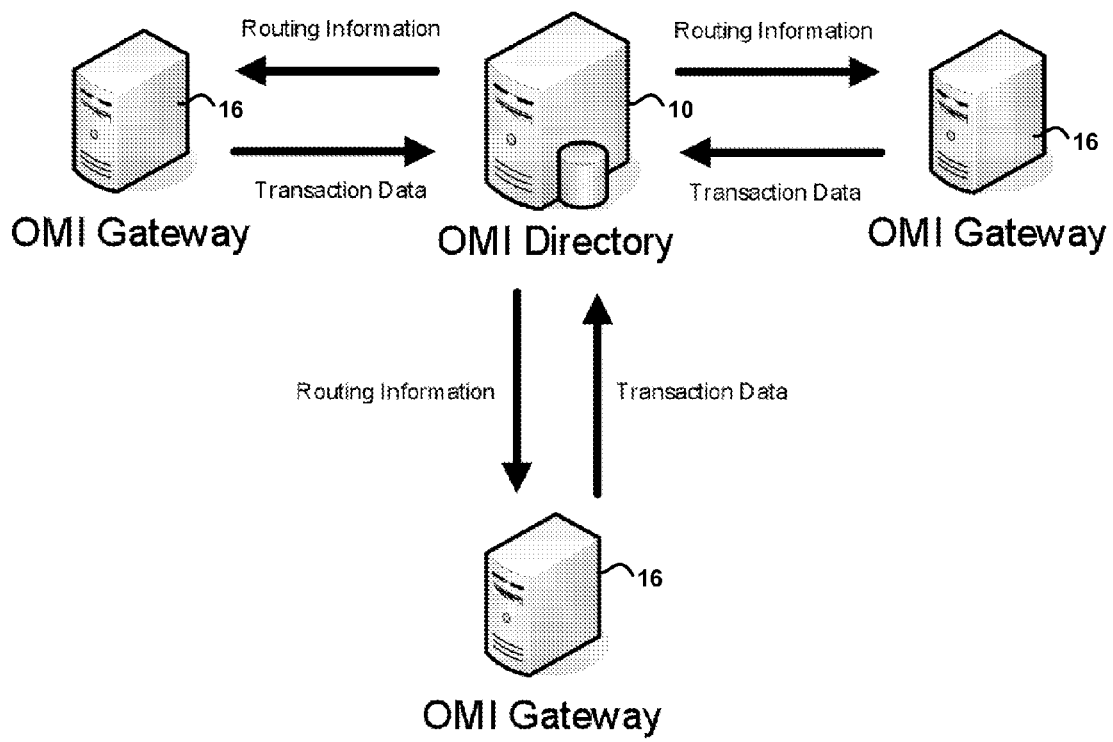
FIG. 4 is an illustration of the system topology of the present invention.

The OMI system architecture consists of two types of systems: Gateways and a Directory. As shown in FIG. 4, these systems are logically connected in a star topology, with the Directory in the center.

The Gateway systems are responsible for all the direct transaction processing in the system. Individual OMS vendors' systems contact a Gateway via OMIP in order to request resolution information of a scanned code. They also log the results of each individual transaction.

The Directory acts as the central repository of the routing information for the system. As the routing information is updated over time to reflect the addition of OMS vendors, the assignment to code ranges to OMS vendors, etc., this information is updated at the Directory. The individual Gateways update themselves from the Directory periodically, and thus the information will propagate through the system within the update time. A pull system is more secure than a push system, in that the Gateways are less likely to be poisoned by inadvertently accepting rogue information. The system can contain a means via which the Directory can request the Gateway to schedule an out-of-sequence pull so that information can be updated more quickly than the normal update interval. In addition, the Directory periodically uploads and collects the accumulated transaction records from the individual Gateways. This process thus creates a central repository of all the transactions that have been served by the system, from which billing and OMS-to-OMS payment calculations can be performed. Note that the Directory itself is not involved in individual resolution transactions themselves.

Over time, it is anticipated that the OMI system as a whole will process a significant number of transactions per unit time. The following factors in the system architecture and design enable the overall system to achieve a high transaction rate:

- Individual Gateway installations are all peers, in that any individual Gateway is capable of correctly identifying or routing any resolution request. As such, it is very straightforward to scale the system horizontally by adding additional Gateways, and distributing the load accordingly. Among other things, this also allows Gateway installations to be deployed, as necessary, in locations that will minimize the network distance between them and the OMS installations.
- Individual Gateway transactions are stateless. As a result, within a particular Gateway physical installation, it is straightforward to use conventional load balancing techniques to spread the load across multiple servers. This also aids in reliability, since it allows individual servers to be added to and removed from the active pool as required for system maintenance, etc.
- The OMI Protocol is based on HTTP or HTTPS. The individual Gateways will be designed to support persistent connections, allowing a single connection to service multiple resolution requests, if desired. This greatly reduces the effective protocol overhead associated with HTTPS implementations.
- The actual data required to achieve proper transaction routing is comparatively small. As such, the individual Gateways are likely to end up with the majority of this information cached in memory, reducing the number of physical accesses to the database on a per-transaction basis. The majority of the steady-state database load will be the writing of log records.

Any system that is central to individual companies' business models must exhibit an extremely high degree of reliability in order to guarantee carrier-grade performance. Individual Gateway installations will typically be constructed using industry-standard techniques involving redundant or fault-tolerant server systems and network equipment. Thus, a typical configuration would contain no single point of failure from a hardware point of view, and would likely use load-balancing hardware to both distribute the transaction load across individual physical servers and also to divert traffic away from a server which has suffered a fault or which needs to be taken offline for maintenance. In addition to employing state-of-the-art hardware to maximize individual installation up-time, there will be a minimum of two physically separated Gateway installations. Each of these installations will contain a full replica of the data required to do transaction routing, and thus will be completely interchangeable for real-time use. As a result, should a network outage or major equipment failure prevent access from an individual OMS to the OMI, the Home OMS will be able to fail over to another OMI installation and continue its operations as required.

Specifically:

- The system will be designed such that each individual Gateway has a unique DNS name, allowing an individual Gateway to be specifically selected for a particular transaction.

The Gateways will share a common DNS name that will be the primary one used for individual transactions under normal circumstances.

Thus, under normal circumstances, a Home OMS will normally first attempt to connect using the shared DNS. If this fails, the Home OMS can then attempt to use the individual names in sequence. Thus:

Under normal circumstances, when all the Gateways are operational, a dynamic DNS system can distribute the transaction load across the various Gateways.

Should one of the Gateways need to be taken offline for maintenance, etc., the DNS system can be updated to exclude that Gateway. After the time required for this DNS update to propagate through the various caches, this will have the effect of diverting all traffic to the other Gateways.

Should a Gateway become unavailable due to unexpected hardware failure or network outage, the retry logic involving the individual Gateway names allows an Home OMS to find a working Gateway without having to wait for a DNS update.

Because it is not involved in individual transactions, the Directory system does not need the same kind of distributed implementation. If the Directory is temporarily down, or needs to be taken off-line for maintenance, the overall performance of the system is not affected in any way. The worst case scenario is that needed updates to routing information would have to wait until the Directory was restored to operation, and that the Gateways might have to buffer transaction records longer than normal. This is not to suggest that the Directory would be constructed to lower standards than the individual Gateways, merely that it is not necessary for the system architecture to deal with the complexity of having multiple physically-separated Directories, with the attendant issues of data synchronization.

Security, in the OMI system, is required at a number of levels:

Physical security.

Physical security of any system involving financial transactions is obviously critical, since without physical security, the security of the data cannot be maintained. The individual Gateway installations, and the Directory installation, will be in security-controlled data centers. In particular, OMI Gateways will not be installed in the physical premises of OMS vendors.

Communication security.

The nature of the communications much be such that fraudulent transactions cannot be inserted into the system, and the valid transactions cannot later be repudiated Optical Messaging Interchange Protocol (OMIP)

The following provides an overview of the information which is carried in the Resolution Request and Resolution Response messages. The nature of the message formats is extensible so that additional fields can be added as required. OMS systems are only required to support those fields marked as Required.

The fundamental protocol is implemented using XML over either HTTP or HTTPS. Thus, all requests and responses are XML documents under normal circumstances. Responses will use HTTP status codes other than 200 OK only in cases indicating system errors.

There are four fundamental messages supported by the system:

OMS Resolution Request

This message is sent from an OMS to the OMI requesting resolution of a particular code.

OMI Resolution Response

This message is sent from the OMI to the OMS in response to an OMS Resolution Request, and carries the information indicating the action that the OMS should perform in response to the code.

OMI Resolution Request

This message is sent from the OMI to an OMS requesting resolution of a particular code.

OMS Resolution Response

This message is sent from the OMS to the OMI in response to an OMI Resolution Request, indicating the action that should be conveyed back to the home OMS.

Thus, the normal sequence of operations is as follows:

The Home OMS, recognizing that it has received a scan of a foreign code, sends an OMS Resolution Request to the OMI.

The OMI determines the Destination OMS according to its routing rules, and transmits the Destination OMS address back to the Home OMS or forwards an OMI Resolution Request to that OMS.

The Destination OMS determines the appropriate action that should be taken, and returns this information to the Home OMS or the OMI in an OMS Resolution Response message.

The OMI passes the result back to the Home OMS, when needed, in an OMI Resolution Response message.

In situations in which the OMI determines that a code cannot or should not be routed, steps 2 and 3 are omitted, and the OMI sends the OMI Resolution Response message back immediately.

The OMS Resolution Request includes the data fields indicated in Table 4 below.

TABLE 4

| Field | Required? |
| --- | --- |
| Home OMS ID | Yes |
| Home OMS Transaction ID | No |
| Transaction Source | Yes |
| Barcode Data | Yes |
| Barcode Symbology | Yes |
| Device Information | No |
| User Demographics | No |
| Access Point Capabilities | No |
| Local Action Preferred | Yes |

In addition, path information may be used in the above message format that will indicate to the OMI if the routing information should be returned back to the home OMS or used by the OMI to forward the Resolution Request directly to the destination OMS. This may be as simple as a flag bit or the like.

The OMI Resolution Request includes the data fields indicated in Table 5 below.

TABLE 5

| Field | Required? |
| --- | --- |
| Home OMS ID | Yes |
| Home OMS Transaction ID | No |
| Transaction Source | Yes |
| Barcode Data | Yes |
| Barcode Symbology | Yes |
| Device Information | No |
| User Demographics | No |
| Access Point Capabilities | No |
| OMI Transaction ID | Yes |
| Destination OMS ID | Yes |

The OMS Resolution Response includes the data fields indicated in Table 6 below.

TABLE 6

| Field | Required? |
|---|---|
| Action | Yes |
| History Restrictions | No |
| Destination OMS Transaction ID | No |

The OMI Resolution Response includes the data fields indicated in Table 7 below.

TABLE 7

| Field | Required? |
|---|---|
| Action | Yes |
| History Restrictions | No |
| Destination OMS Transaction ID | No |
| OMI Transaction ID | Yes |

The following Table 8 describes each of the message fields in the various OMIP messages:

TABLE 8

| Field | Description |
|---|---|
| Access Point Capabilities | This optional field indicates which categories of Actions the Access Point is capable of performing. If omitted, it will be assumed that the Access Point is capable of supporting all defined operations. |
| Action | This field indicates the action that should be performed by the Home OMS. Defined actions include: Launch HTTP/HTTPS URL. Dial a telephone number. Send an SMS. Display a coupon Display data (e.g. text, HTML) Different from the Launch command in that the Action carries the data itself, rather than a reference to it. Home OMS to provide appropriate Action (used to indicate that the OMI has not provided an Action) The format of the Action field allows both: Multiple sequential Actions to be specified, so that an Access Point may be commanded to do multiple things. Multiple possible Actions to be specified, where the Access Point should respond by choosing the first Action that it is capable of implementing |
| Barcode Data | Contents of the barcode |
| Barcode Symbology | Identification of the particular symbology in which the barcode data was encoded. A special Keyboard symbology is included to handle the case in which the information was keyed in by the user, instead of being scanned. |
| Destination OMS ID | The value in this field identifies the OMS that originated the transaction. |
| Destination OMS Transaction ID | This is an optional field that allows the Destination OMS to uniquely identify the transaction using its own internal system, independent of the OMI Transaction ID. If provided, the OMI will log this information in its own transaction store, and will also pass it back to the Home OMS. This value can be used for after-the-fact reconciliation and auditing purposes. |
| Device Information | This is an optional field that provides manufacturer and model information about the Access Point device that originated the transaction. |
| History Restrictions | Indicates whether or not the Access Point may save the request or response information for later reuse by the end user. Possible values: The data must not be reusable. (Suitable for situations in which the user must physically re-scan a barcode in order to repeat a transaction.) The barcode data may be stored. (Suitable for situations in which recall by the user is acceptable, but a server transaction must occur each time.) The response data may be stored. (Suitable for situations in which it is acceptable for the information to be redisplayed without consulting the server again, such as storing coupon data for later display and redemption.) Note that Access Points are not obligated to implement a history feature - this information is intended to allow OMS that have restrictions on how items can be saved to pass these restrictions on to other OMS. If this data is omitted, the Access Point is free to choose its own behavior. |
| Local Action Preferred | This field indicates whether the Home OMS would prefer to provide content for this transaction if this is permitted. If this field is set and if the particular code is not exclusively assigned to a particular Destination OMS, the OMI will return an Action that authorizes the Home OMS to provide the Action. |
| OMI Transaction ID | This field contains a number that uniquely identifies this particular transaction at the OMI. This value can be used for after-the-fact reconciliation and auditing purposes. |
| Home OMS ID | The value in this field identifies the OMS that originated the transaction. |
| Home OMS Transaction ID | This is an optional field that allows the Home OMS to uniquely identify the transaction using its own internal system, independent of the OMI Transaction ID. If provided, the OMI will log this information in its own transaction |

TABLE 8-continued

| Field | Description |
|---|---|
| | store, and will also pass it to the Destination OMS. This value can be used for after-the-fact reconciliation and auditing purposes. |
| Transaction Source | This optional field ndicates the source of this transaction: Direct scan of a barcode Data typed in by user History List retrieval of a prior barcode scan History List retrieval of prior typed-in data |
| User Demographics | This is an optional field that provides information about the Access Point end user. This information may be used by the Destination OMS to refine the resolution process. Defined subfields include: User Language (preferred language of the user) Country (indicates where the user is located) Gender Age Additional fields will be added as required by OMS Vendors. |

Security is, of course, of paramount importance in any system that involves or generates financial transactions. The OMI includes the following security features:

On the incoming OMIP channels:

Each individual Resolution Request requires authentication.

The OMI optionally offers SSL encryption on its input channels, with the additional option of using symmetric public keys to further secure the OMS-to-OMI channel.

Resolution Requests are only accepted from pre-defined IP addresses or ranges of IP addresses. This allows requests from legitimate sources to be passed, while helping to prevent unauthorized parties from making use of the system, even if the authentication information becomes compromised.

On the outgoing OMIP channels:

Each individual Resolution Request may carry authentication, if required by the target OMS.

The OMI optionally offers SSL encryption support on its output channels, with the option of using symmetric public keys.

As stated earlier, it is a core business assumption that participating companies see the extended reach provided by OMI participation as being beneficial to them, and thus they are willing to bear the financial burden of participating in the interchange. In particular, in many situations, this means that the Destination OMS will be willing to compensate the Home OMS for having serviced one of their barcode symbols. The OMI provides all the required logging and data processing required for cross-company billing in support of OMI operations.

The OMI fee structure depends on the following items:
Home OMS
Destination OMS
Barcode Symbology
Message Quantity Payment schedules are established by the Home OMS, and may be general (e.g. I will pay anyone who scans one of my codes $0.02) or specific (e.g. I will pay OMS B $0.03 for each of my UPC codes they scan.). The two may be combined, with specific fees taking precedence over general fees. In addition, the fee schedule can be tiered so that the rate per message changes based on the total number of messages serviced on a monthly basis.

Note that the OMI does not attempt to implement any request-by-request variable fees (e.g. revenue sharing) however it does provide full transaction-by-transaction reports to participating OMS companies, allowing them to reconcile such matters between themselves if appropriate. In addition, fees are only imposed for resolution requests that result in the destination OMS providing the resolution service—no charges result from requests that result in an error condition, or if the responsibility for providing the eventual action is delegated back to the Home OMS. Finally, the OMI itself will impose a fee on each successful resolution delivered in order to offset its own operating costs.

The OMI will serve as the financial intermediary between the participating OMS, thus simplifying their own financial processing. The OMI will provide each participating OMS with monthly summary statements indicating the number of transactions processed by and on behalf of each OMS, and the corresponding net payment due from or to the OMI.

The OMI will grant each OMS access to detailed reporting, including log dumps, associated with all transactions originated by or served by the OMS.

We claim:

1. A method of processing a machine readable code to perform a desired function comprising:
a) reading with a client device a machine-readable code to obtain code data;
b) transmitting the code data from the client device to a home messaging system;
c) processing the code data at the home messaging system to determine if the code data is native to the home messaging system;
d) if the code data is native to the home messaging system, then the home messaging system further processing the code data by performing a function in accordance with the code data; and
e) if the code data is not native to the home messaging system, then:
 i) the home messaging system transmitting a resolution request message to a messaging interchange system, the resolution request message comprising said code data;
 ii) the messaging interchange system processing the resolution request message to determine routing information to a destination messaging system, wherein the code data is native to the destination messaging system;
 iii) the messaging interchange system enabling transmission of the resolution request message to the destination messaging system;
 iv) the destination messaging system analyzing the code data from the resolution request message and providing resolution response message for the home messaging system; and
 v) the home messaging system receiving the resolution response message and performing a function in accordance therewith;
wherein the messaging interchange system enables transmission of the resolution request message to the destination messaging system by determining path information from the resolution request message, said path information indicating whether (A) the routing information should be returned to the home messaging system, or (B) the routing information should be used by the messaging interchange system for forwarding the resolution request message to the destination messaging system.

2. The method of claim 1 wherein if the path information indicates that (A) the routing information should be returned to the home messaging system, then
   i) the messaging interchange system transmitting a response message to the home messaging system, said response message comprising the routing information for the destination messaging system,
   ii) the home messaging system using the routing information for the destination messaging system to send the resolution request message to the destination messaging system; and
   iii) the destination messaging system providing a resolution response message for the home messaging system by transmitting the resolution response message directly to the home messaging system or client device.

3. The method of claim 1 wherein if the path information indicates that (B) the routing information should be used by the messaging interchange system for forwarding the resolution request message to the destination messaging system, then
   i) the messaging interchange system using the routing information for the destination messaging system to forward the resolution request message to the destination messaging system; and
   ii) the destination messaging system provides a resolution response message for the home messaging system by transmitting the resolution response message to the messaging interchange system, and the messaging interchange system forwards the resolution response message to the home messaging system.

4. A method for a messaging interchange system to manage a plurality of independent messaging systems comprising:
   a) receiving a resolution request message from a home messaging system, the resolution request message comprising code data obtained from a machine-readable code;
   b) processing the resolution request message to determine:
      i) routing information to a destination messaging system, wherein the code data is native to the destination messaging system, and
      ii) path information indicating whether (A) the routing information should be returned to the home messaging system, or (B) the routing information should be used by the messaging interchange system for forwarding the resolution request message to the destination messaging system;
   c) if the path information indicates that (A) the routing information should be returned to the home messaging system, then
      (i) the messaging interchange system transmitting a response message to the home messaging system, said response message comprising the routing information for the destination messaging system, or
   d) if the path information indicates that (B) the routing information should be used by the messaging interchange system for forwarding the resolution request message to the destination messaging system, then
      (i) the messaging interchange system using the routing information for the destination messaging system to forward the resolution request message to the destination messaging system,
      (ii) the messaging interchange system receiving a resolution response message from the destination messaging system, and
      (iii) the messaging interchange system forwarding the resolution response message to the home messaging system or client device.

5. A system for processing a machine readable code to perform a desired function comprising a client device in communication with a home messaging system, a messaging interchange system in networked communication with the home messaging system, and a destination messaging system in networked communication with either or both of the home messaging system and the messaging interchange system; wherein:
   a) the client device comprises input circuitry for reading a machine-readable code; and processing circuitry programmed for:
      i) obtaining code data from said machine-readable code; and
      ii) transmitting the code data to a home messaging system;
   b) the home messaging system comprises processing circuitry programmed for:
      i) analyzing the code data to determine if the code data is native to the home messaging system,
      ii) performing a function in accordance with the code data if the code data is native, to the home messaging system;
      iii) it the code data is not native to the home messaging system, then transmitting a resolution request message to a messaging interchange system, the resolution request message comprising said code data;
   c) the messaging interchange system comprises processing circuitry programmed for:
      i) analyzing the resolution request message to determine routing information to a destination messaging system, wherein the code data is native to the destination messaging system; and
      ii) enabling transmission of the resolution request message to the destination messaging system;
   d) the destination messaging system comprises processing circuit programmed for:
      i) analyzing the code data from the resolution request message and providing a resolution response message for the home messaging system; and
   e) the processing circuitry of the home messaging system is further programmed for receiving the resolution response message and performing a function in accordance therewith;
wherein the processing circuitry of the messaging interchange system is programmed for enabling transmission of the resolution request message to the destination messaging system by determining path information from the resolution request message, said path information indicating whether (A) the routing information should be returned to the home messaging system, or (B) the routing information should be used by the messaging interchange system for forwarding the resolution request message to the destination messaging system.

6. The system of claim 5 wherein
   the processing circuitry of the messaging interchange system is further programmed to, if the path information indicates that (A) the routing information should be returned to the home messaging system, transmit a response message to the home messaging system, said response message comprising the routing information for the destination messaging system;
   the processing circuitry of the home messaging system is further programmed to use the routing information for the destination messaging system to send the resolution request message to the destination messaging system; and the processing circuitry of the destination messaging system is programmed for providing a resolution response message for the home messaging system by transmitting the resolution response message directly to the home messaging system or client device.

7. The system of claim 5 wherein:

the processing circuitry of the messaging interchange system is further programmed to, if the path information indicates that (B) the routing information should be used by the messaging interchange system for forwarding the resolution request message to the destination messaging system, then using the routing information for the destination messaging system to forward the resolution request message to the destination messaging system; and the processing circuitry of the destination messaging system is programmed for providing a resolution response message for the home messaging system by transmitting the resolution response message to the messaging interchange system, and the messaging interchange system forwards the resolution response message to the home messaging system.

8. A messaging interchange system for managing a plurality of independent messaging systems, comprising processing circuitry programmed for:

a) determining, from a resolution request message received from a home messaging system and comprising code data obtained from a machine-readable code,
   i) routing information to a destination messaging system, wherein the code data is native to the destination messaging system, and
   ii) path information indicating whether (A) the routing information should be returned to the home messaging system, or (B) the routing information should be used by the messaging interchange system for forwarding the resolution request message to the destination messaging system;

b) if the path information indicates that (A) the routing information should be returned to the home messaging system, then
   i) transmitting a response message to the home messaging system, said response message comprising the routing information for the destination messaging system, or c) if the path information indicates that (B) the routing information should be used by the messaging interchange system for forwarding the resolution request message to the destination messaging system, then
   i) using the routing information for the destination messaging system to forward the resolution request message to the destination messaging system,
   ii) receiving a resolution response message from the destination messaging system, and
   iii) forwarding the resolution response message to the home messaging system or client device.

* * * * *